No. 780,672. PATENTED JAN. 24, 1905.
W. H. LANG.
PISTON PACKING.
APPLICATION FILED SEPT. 19, 1904.
2 SHEETS—SHEET 1.
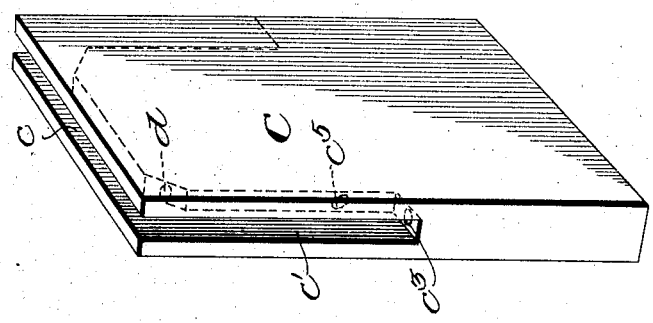
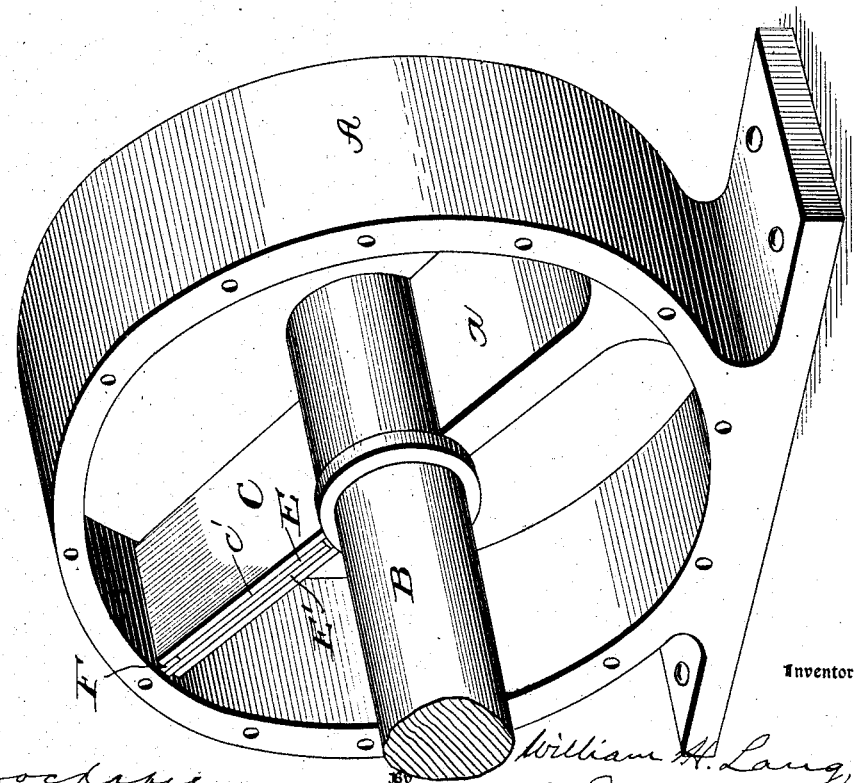

No. 780,672. PATENTED JAN. 24, 1905.
W. H. LANG.
PISTON PACKING.
APPLICATION FILED SEPT. 19, 1904.

2 SHEETS—SHEET 2.

Witnesses
Inventor
William H Lang
By
J. Dunham
Attorney

No. 780,672. Patented January 24, 1905.

UNITED STATES PATENT OFFICE.

WILLIAM H. LANG, OF MISHAWAKA, INDIANA.

PISTON-PACKING.

SPECIFICATION forming part of Letters Patent No. 780,672, dated January 24, 1905.

Application filed September 19, 1904. Serial No. 225,021.

*To all whom it may concern:*

Be it known that I, WILLIAM H. LANG, a citizen of the United States, residing at Mishawaka, in the county of St. Joseph and State of Indiana, have invented certain new and useful Improvements in Piston-Packing; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to piston-packing, and is designed primarily as an improvement upon the packing heretofore used in connection with oil-operated water-wheel governors.

The object of the invention is to provide a packing for the edges of a flat piston that will at all times be absolutely tight and one that will, by means of the construction and arrangement of the packing-strips and the springs relatively to the piston, fully compensate for all wear.

With this and other objects in view the invention comprises certain features of construction and combination and arrangement of parts described in detail in the following specification, particularly pointed out in the claims, and illustrated in the accompanying drawings.

Figure 3:
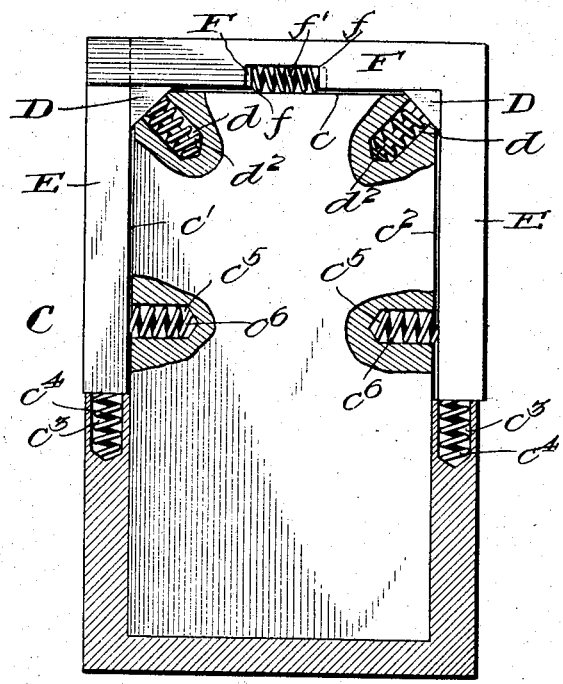
Figure 4:
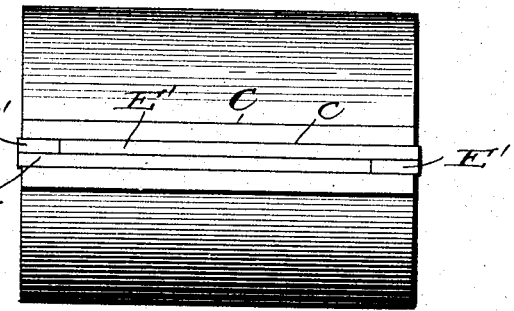
Figure 5:
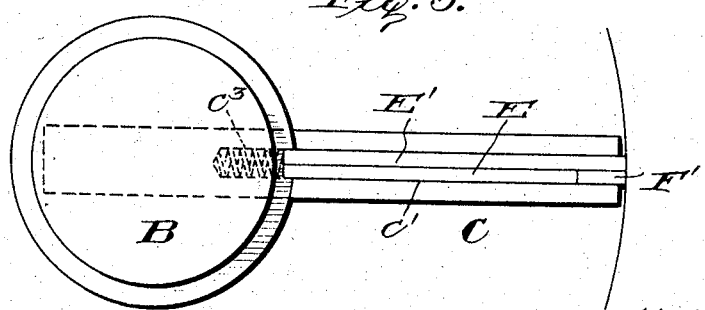

In the drawings, Figure 1 is a perspective view of the cylinder of a governor, showing the piston provided with my packing. Fig. 2 is a perspective view of the piston, the packing-strips being removed. Fig. 3 is a top view of the piston, partly in section. Fig. 4 is an end view of the piston. Fig. 5 is a side view of the piston.

It is a well-known fact that the sensitiveness of governors of this character depends entirely upon the tightness of the joint between the piston and the cylinder. If there be an absolutely tight joint, and consequently no leak, the governor is caused to respond promptly to any difference in pressure on the two sides of the piston. If there is a leak, the action of the piston will be sluggish and there will be an interval before a movement of the piston is effected. Various means have been resorted to in an effort to assure an absolutely tight joint; but so far as I am aware none have been entirely successful.

In carrying out my invention I provide a closed stationary cylinder A, into and through which passes a shaft B. A partition $a$ is extended from one wall of the cylinder A into the said shaft B, and the said partition $a$ divides the cylinder A into two parts.

The shaft B at its portion within the cylinder A is enlarged, and firmly attached thereto or embedded therein is a flat rectangularly-shaped piston C. The end and the two sides of this piston are grooves, as $c$, $c'$, and $c^2$, the end groove $c$ being extended entirely across the front edge of the piston, the two side grooves $c'$ $c^2$ being extended to the shaft, at which point the grooves end and a pocket or recess $c^3$ is formed into the piston, and into these pockets or recesses $c^3$ are placed strong springs $c^4 c^4$, preferably spiral. These springs $c^4 c^4$ are so arranged relatively to the said side grooves whereby they exert a pressure longitudinally of the said grooves. At a suitable distance from the said pockets or recesses $c^3 c^3$ and within the said side grooves are side pockets or recesses $c^5 c^5$, and into each of these side pockets or recesses are placed strong springs $c^6 c^6$, preferably spiral. The arrangement and location of said side springs are such whereby they exert a pressure laterally of the said side grooves.

The end of the piston C within the front groove has its corners beveled off, and from each of these beveled portions a pocket or recess $d$ $d$ is extended diagonally into the piston C, and into these pockets or recesses are placed strong springs $d^2$ $d^2$.

D D are corner-pieces having each a stem extending into the said pocket or recess $d$ and through the spring $d^2$. The heads of these corner-pieces D D are triangular-shaped and are adapted to "fill out" the beveled portion of the piston within the grooves.

E E' are metal strips adapted to be placed in the side grooves $c'$ $c^2$. These side strips are arranged in sets of two to each groove and are placed side by side within each groove. One of the strips, E, in each groove is of such a length that it extends from the inner end of the side groove to the beginning of the groove across the end of the piston. The other strip, E', is slightly longer and its end projects beyond the front groove. The two strips in each of the said side grooves are of a corresponding size; but the method of arranging them in the said grooves is different—that is to say, that if the short strip E is the upper strip in the groove upon the right side of the piston then the short strip is the under strip in the left groove of the piston.

F F' are two metallic packing-strips, which are placed within the groove across the front edge of the piston. These packing-strips are of the same length and are so arranged whereby their ends will break joints with the side strips E E'. Each of these strips adjacent to and at opposite points from their centers are provided with a notched or cut-away portion $f$, and a spring $f'$, preferably spiral, is placed within said notched or cut-away portion, the said spring being so arranged whereby it will exert a pressure upon opposite ends of each notch or cut-away portion and tend to force the said strips F F' in opposite directions.

The manner of arranging the end strips relatively to the side strips is shown more clearly in Figs. 4 and 5, and it will be seen that on one side of the piston the packing-strips are arranged so that the under strip is the longer or extended one, the upper strip being the shorter strip or the strip that extends only to about on a line with the beginning of the end groove. The strips on each side are arranged oppositely—that is, on one side the upper member of the side strips is the longer strip, on the opposite side of the piston the upper strip is the shorter member. The two front strips are so arranged whereby the upper strip is extended across the end of the extended strip of one of the side strips until its outer edge is on a line with the outer edge of the said extended side strip, the opposite end of the said upper end strip abutting against the inner edge of the upper strip in the groove at the opposite side of the piston. The under strip of the front groove has its outer edge abutting against the inner edge of the side strip upon which the upper end strip is resting, its opposite end being extended under the projecting end of the side strip until its outer edge is in a line with the outer edge of the side strips. It will be understood, of course, that the edges of all of the strips that come in contact with the cylinder are in alinement and that the pressure exerted upon these strips by the various springs is constant and uniform.

From the foregoing description it will be seen that a constant and uniform pressure is exerted longitudinally and laterally upon the side strips, that a constant and uniform pressure is exerted tending to force the two end strips laterally in opposite directions, and that by means of the two diagonally-arranged corner-pieces a constant and uniform pressure is exerted to form a close and tight corner at the points where the strips overlap and break joint, and it will also be seen that as all of these strips are by means of the springs being constantly forced against the cylinder all wear is taken up.

I claim as my invention—

1. In a device of the character described, a cylinder, a flat piston having grooved edges at its end and at its two sides, packing-strips in said grooves, the side packing-strips and the end packing-strips having their ends overlapped, means carried by said end packing-strips adapted to exert pressure to force the said end strips in opposite directions, and means carried by said piston for forcing the edges of said side strips and the end strips into tight contact with the said cylinder.

2. In a device of the character described, a piston having end and side grooves, said end and side grooves being provided with pockets, springs seated within said pockets, and packing-strips arranged within said grooves, the packing-strips in each side groove and end groove being so arranged whereby their ends will overlap and break joints with one another.

3. In a device of the character described, a piston having side and end grooves, packing-strips for said side and end grooves, the packing-strips within the end groove being each provided with a cut-out portion at opposite sides of their centers, a spring within the said cut-out portion tending to force said end strips in opposite directions, and means for exerting a pressure tending to force the end and side strips in an outward direction relatively to said piston.

4. In a device of the character described, a piston having end and side grooves, the corners of said piston within said grooves being beveled off, packing-strips in the said end and side grooves, the end packing-strips being provided with cut-out portions, means located within said cut-out portions tending to force said end strips in opposite directions, the said end strips and side strips being so arranged relatively to one another whereby their ends will overlap and break joint with one another.

5. In a device of the character described a flat piston having its end and side edges grooved and provided with pockets, springs seated within said pockets, the two corners of said piston within said grooves being beveled off, packing-strips arranged within said grooves, the ends of said side and end strips being so arranged relatively to one another whereby they alternately overlap and break joint, and a spring-pressed corner-piece adapted to exert pressure upon each of the said packing-strips and the end packing-strips at the overlapped portion.

In testimony whereof I affix my signature in presence of two witnesses.

WILLIAM H. LANG.

Witnesses:
H. N. S. HORNE,
EDA E. ROSENCRANS.